United States Patent
Lee et al.

(10) Patent No.: US 8,615,197 B2
(45) Date of Patent: *Dec. 24, 2013

(54) METHOD AND APPARATUS FOR CONNECTING TO NETWORK IN A SHORT-RANGE MOBILE COMMUNICATION TERMINAL

(75) Inventors: Jeong-Eun Lee, Gyeonggi-do (KR); Jae-Ho Kim, Seoul (KR); Woo-Jun Choi, Gyeonggi-do (KR); Young-Seop Han, Gyeonggi-do (KR); Dae-Hyun Sim, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/488,984

(22) Filed: Jun. 5, 2012

(65) Prior Publication Data

US 2012/0244808 A1   Sep. 27, 2012

Related U.S. Application Data

(63) Continuation of application No. 12/234,952, filed on Sep. 22, 2008, now Pat. No. 8,200,155.

(30) Foreign Application Priority Data

Sep. 21, 2007 (KR) ........................ 10-2007-0096977

(51) Int. Cl.
*H04B 7/00* (2006.01)
(52) U.S. Cl.
USPC ........... 455/41.2; 455/500; 455/524; 455/525

(58) Field of Classification Search
USPC .................. 455/41.2, 500, 524, 525; 370/338
See application file for complete search history.

(56) References Cited

U.S. PATENT DOCUMENTS

| | | | |
|---|---|---|---|
| 5,327,575 A | 7/1994 | Menich et al. | |
| 5,768,684 A | 6/1998 | Grubb et al. | |
| 5,987,099 A | 11/1999 | O'Neill et al. | |
| 6,553,002 B1 | 4/2003 | Bremer et al. | |
| 6,567,380 B1 | 5/2003 | Chen | |
| 2002/0090949 A1 | 7/2002 | Stanforth | |
| 2002/0102977 A1 | 8/2002 | Shi | |
| 2005/0220063 A1 | 10/2005 | Hong et al. | |
| 2006/0025169 A1 | 2/2006 | Maciocco et al. | |

*Primary Examiner* — Edward Urban
*Assistant Examiner* — Hsin-Chun Liao
(74) *Attorney, Agent, or Firm* — The Farrell Law Firm, P.C.

(57) ABSTRACT

A method and apparatus are provided for reconnecting from a serving coordinator of a serving WPAN to a coordinator of another WPAN. The method includes broadcasting a neighbor terminal information request message periodically to neighbor terminals; receiving a neighbor information response message, having neighbor terminal information and LQI, from at least one neighbor terminal, responding to the neighbor terminal information request message; storing a neighbor table having the LQI and the neighbor terminal information included in the neighbor information response message, the neighbor terminal information including the LQI, a PAN ID of a WPAN to which the at least one neighbor terminal belongs and neighbor router information about the at least one neighbor terminal; and reconnecting to the coordinator of the another WPAN using the LQI and the neighbor terminal information and communicating with the coordinator of the other WPAN.

16 Claims, 6 Drawing Sheets

METHOD AND APPARATUS FOR CONNECTING TO NETWORK IN A SHORT-RANGE MOBILE COMMUNICATION TERMINAL

PRIORITY

This application is a Continuation of U.S. application Ser. No. 12/234,952, which was filed in the U.S. Patent and Trademark Office on Sep. 22, 2008, and claims priority under 35 U.S.C. §119(a) to Korean Patent Application Serial No. 2007-96977, which was filed in the Korean Intellectual Property Office on Sep. 21, 2007, the entire disclosure of each of which is hereby incorporated by reference.

BACKGROUND OF THE INVENTION

1. Field of the Invention

The present invention relates generally to a method and apparatus for short-range mobile communications, and more particularly, to a method and apparatus for a short-range mobile communication terminal to connect to a short-range network.

2. Description of the Related Art

A Wireless Personal Area Network (WPAN) is a wireless implementation of an existing Personal Area Network (PAN). Compared to a Local Area network (LAN) and a Wide Area Network (WAN), the PAN is a network unique to an individual person, that is, a network that interconnects devices owned by the individual person to enhance his convenience.

As an effort to wirelessly realize the PAN, the Institute of Electrical and Electronics Engineers (IEEE) 802.15 working group set forth the WPAN as a standard for a short-range wireless network and organized four Task Groups (TGs) under it. IEEE 802.15.1, IEEE 802.15.3 & 802.15.3a, and IEEE 802.15.4 are standards for Bluetooth™ (hereinafter "Bluetooth"), high-rate WPAN, and low-rate WPAN (ZigBee™ (hereinafter "ZigBee"), respectively.

A WPAN formed by a short-range mobile communication system such as ZigBee is composed of a plurality of short-range mobile communication terminals. One of the short-range terminals is designated as a coordinator and the other short-range terminals act as routers or end devices. The coordinator broadcasts a synchronization signal, i.e. a beacon to the other short-range terminals to thereby synchronize the routers or end devices, for mutual communications.

A plurality of such WPANs are formed apart from each other by some distance or overlapping with each other over a predetermined area. As a short-range terminal is mobile, it can move from one WPAN to another WPAN. To this end, the short-range terminal should transmit a leave message to a coordinator of an old WPAN that it is currently in connection with, scan neighbor WPANs to detect and access a new WPAN, and get its user to select one of the detected WPANs. Also, the short-range terminal sends request to join to a coordinator of the selected new WPAN. When the coordinator acknowledges the joining request, the short-range terminal completes the joining procedure to the new WPAN.

As described above, scanning of neighbor WPANs and user selection of a WPAN are required for a short-range terminal to connect to a new WPAN. Therefore, the time required to connect to the new WPAN is long, causing inconvenience to a user.

SUMMARY OF THE INVENTION

The present invention is designed to address at least the problems and/or disadvantages described above and to provide at least the advantages described below.

Accordingly, an aspect of the present invention is to provide a method and apparatus for a short-range mobile communication terminal to automatically connect to a neighbor WPAN.

Another aspect of the present invention is to provide a method and an apparatus for a short-range mobile communication terminal to fast connect to a neighbor WPAN.

Another aspect of the present invention is to provide a method and an apparatus for a short-range mobile communication terminal to connect to a neighbor WPAN without a complex procedure.

In accordance with an aspect of the present invention, a method is provided for reconnecting from a serving coordinator of a serving Wireless Personal Area Network (WPAN) to a coordinator of another WPAN. The method includes broadcasting a neighbor terminal information request message periodically to neighbor terminals; receiving a neighbor information response message, having neighbor terminal information and Link Quality Information (LQI), from at least one neighbor terminal, responding to the neighbor terminal information request message; storing a neighbor table having the LQI and the neighbor terminal information included in the neighbor information response message, the neighbor terminal information including the LQI, a Personal Area Network (PAN) Identifier (ID) of a WPAN to which the at least one neighbor terminal belongs and neighbor router information about the at least one neighbor terminal; and reconnecting to the coordinator of the another WPAN using the LQI and the neighbor terminal information and communicating with the coordinator of the other WPAN.

In accordance with another aspect of the present invention, an apparatus is provided for reconnecting from a serving coordinator of a serving Wireless Personal Area Network (WPAN) to a coordinator of another WPAN by Zigbee communications in a terminal. The apparatus includes a transceiver for transmitting and receiving signals and messages and receiving a neighbor information response message, having neighbor terminal information and Link Quality Information (LQI), from at least one neighbor terminal, responding to a neighbor terminal information request message; and a controller for controlling the transceiver, broadcasting the neighbor terminal information request message periodically through the transceiver, storing a neighbor table having the LQI and the neighbor terminal information included in the neighbor information response message, the neighbor terminal information including the LQI, a Personal Area Network (PAN) Identifier (ID) of a WPAN to which the at least one neighbor terminal belongs and neighbor router information about the at least one neighbor terminal, and reconnecting to the coordinator of the another WPAN using the LQI and the neighbor terminal information and communicating with the coordinator of the other WPAN.

BRIEF DESCRIPTION OF THE DRAWINGS

The above and other aspects, features, and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
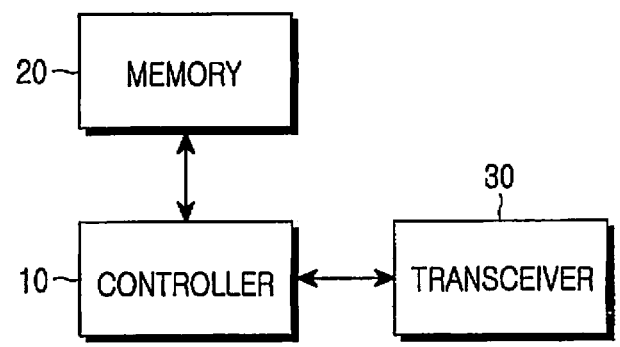
FIG. 1 is a block diagram of a short-range terminal according to an embodiment of the present invention.

With reference to FIG. 1, the configuration of a short-range terminal for conducting ZigBee communications according to an exemplary embodiment of the present invention will be described.

Referring to FIG. 1, the short-range terminal includes a controller 10, a memory 20, and a transceiver 30.

The memory 20 stores a variety of data needed for ZigBee communications, inclusive of control data, codes and network device IDentifier (ID) registration information for ZigBee communications, a neighbor table, a router discovery table, a routing table, and a broadcast table. The transceiver 30 transmits and receives ZigBee signals under the control of the controller 10.

The controller 10 controls ZigBee communication-related operations of the short-range terminal and accordingly controls the memory 20 and the transceiver 30. That is, during a network setup, the controller 10 controls the transceiver 30 to transmit an address information request signal and a network connection signal to terminals within a power range in which ZigBee communications are available, generates a neighbor table based on address information received from the terminals, and stores the neighbor table in the memory 20, wherein the neighbor table further includes information indicating whether the at least one neighbor terminal is a coordinator, a router, or a terminal. The neighbor table further includes relation information indicating whether the at least one neighbor terminal is a parent, a child, a previous child, or none to the terminal.

After the network setup, the controller 10 controls the transceiver 30 to transmit information about an address allocated during the network setup to the terminals within the power range. During data transmission, the controller 10 controls data transmission of the transceiver 30 based on the neighbor table. The allocated address information is transmitted by a beacon. According to the present invention, after connecting to a network, the controller 10 acquires information about the RSSIs of the neighbor terminals and information about the neighbor terminals through the transceiver 30, determines how close the short-range terminal is to neighbor WPANs according to movement of the short-range terminal, and automatically selects and connects to a WPAN according to the closenesses of the WPANs.

For this purpose, the controller 10 periodically broadcasts a neighbor terminal information request message through the transceiver 30. The neighbor terminal information request message, which includes information about an address of the transmitting terminal, requests terminal information including a neighbor table to neighbor short-range terminals. Upon receipt of the neighbor terminal information request message, each of the neighbor short-range terminals includes a current stored neighbor table, its address information, and a PAN ID of a WPAN to which it belongs in a neighbor terminal information response message and transmits the neighbor terminal information response message to the address set in the neighbor terminal information request message. Upon receipt of the neighbor terminal information response messages, the transceiver 30 measures the RSSIs of the received messages and provides the received messages and the RSSIs to the controller 10. The controller 10 analyzes the neighbor terminal information response messages, updates neighbor terminal information about the neighbor terminals referring to neighbor tables included in neighbor terminal information response messages and the PAN IDs of neighbor WPANs collected and stored previously, and stores the updated neighbor terminal information in the memory 20. This operation is performed for each neighbor terminal that has transmitted a neighbor terminal information response message.

With neighbor tables, terminals can acquire information about each other when one terminal joins another terminal. Therefore, when one of terminals which have joined to a particular terminal and of which terminal information was stored in the particular terminal requests joining to the particular terminal, the one terminal can immediately join the particular terminal without channel scanning. The controller 10 also stores RSSIs received from the transceiver 30 in the memory 20, on a terminal basis. The RSSIs are used to determine the closenesses between the short-range terminal and the neighbor terminals or neighbor WPANs. That is, the controller 10 determines a neighbor WPAN with the highest RSSI to be the closest WPAN, joins the neighbor short-range terminal with the WPAN having the highest RSSI through the transceiver 30, transmits a leave message to a coordinator of the current WPAN, requests joining to a coordinator of the neighbor WPAN, and thus completes connection to the new WPAN.

The operation of the short-range terminal will be described below with reference to. This operation involves initial access to one WPAN to connection to another WPAN.

Figure 2A:
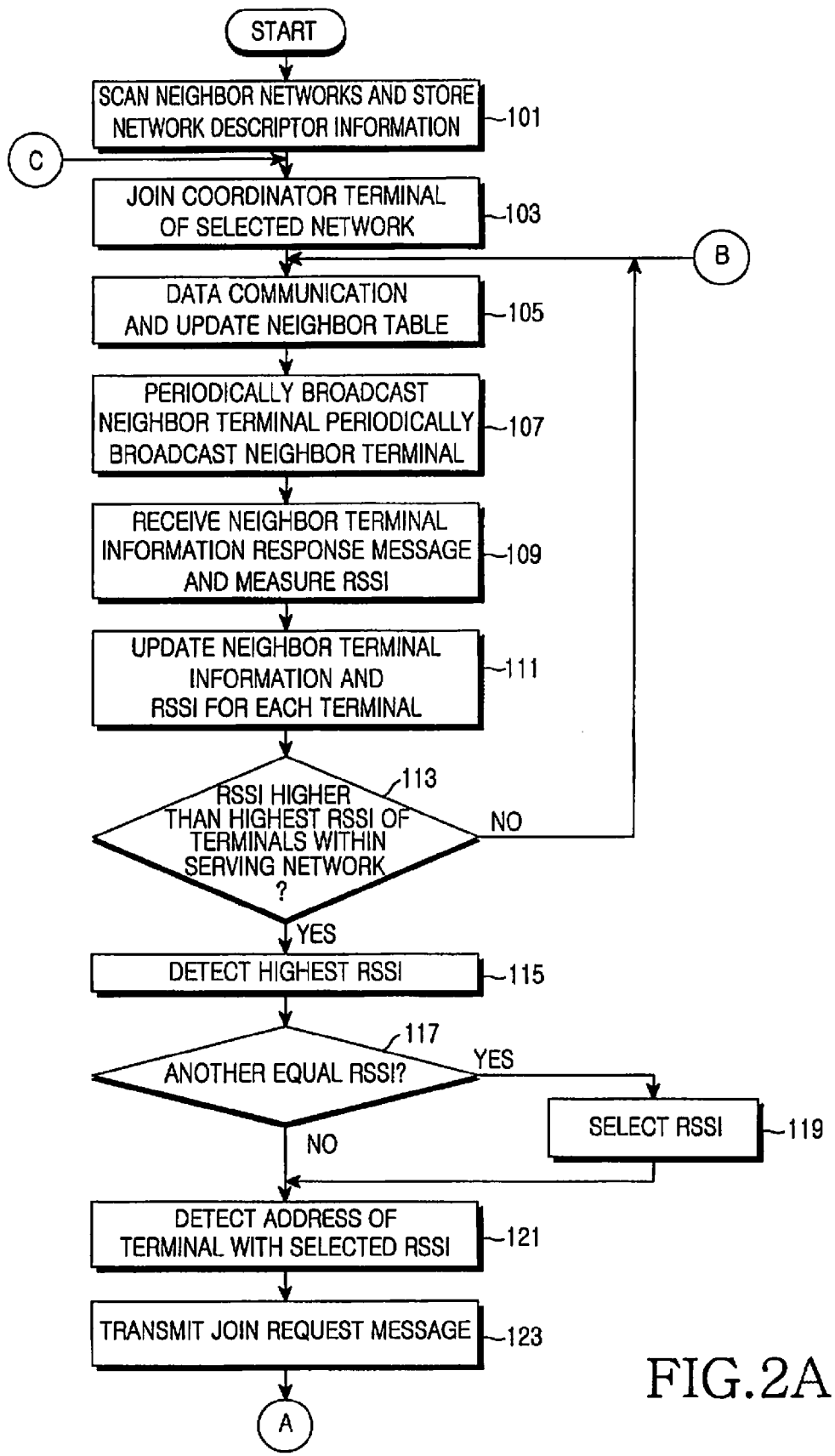
FIGS. 2A and 2B are flowcharts illustrating an operation of the short-range terminal according to an embodiment of the present invention.
Figure 2B:
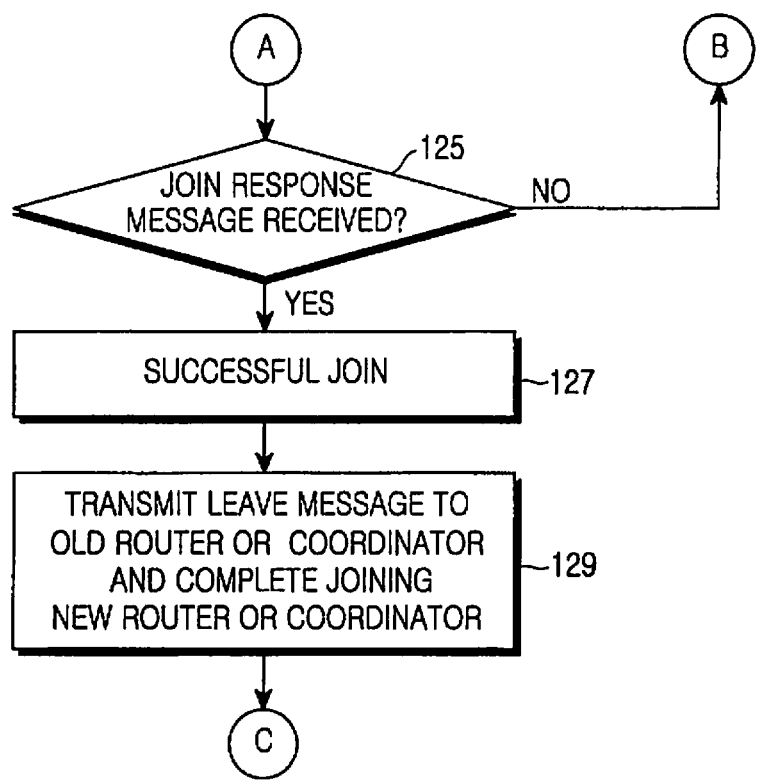

Referring to FIGS. 2A and 2B, in step 101 the short-range terminal scans neighbor WPANs and stores network descriptor information about the scanned WPANs together with beacon information about them. The short-range terminal then provides the scanned WPAN information to a user. When the user selects one of the WPANs, the short-range terminal in step 103 connects to the selected WPAN by joining a coordinator of the selected WPAN. The short-range terminal updates a neighbor table by data communications with other short-range terminals within the current WPAN in step 105 and periodically broadcasts a neighbor terminal information request message in step 107.

Upon receipt of the neighbor terminal information request message, neighbor short-range terminals transmit neighbor terminal information response messages including their currently stored neighbor tables to the short-range terminal, even though they are not connected to the WPAN. In step 109, the short-range terminal receives the neighbor terminal information response messages from the neighbor terminals and measures the RSSIs of the messages. The short-range terminal updates neighbor terminal information and RSSIs for the respective neighbor terminals, referring to the network descriptor information of the neighbor WPANs in step 111 and in step 113 determines the highest RSSI of the terminals connected to the current WPAN based on the updated information. The short-range terminal determines whether there is a higher RSSI than the detected RSSI by comparing the detected RSSI with the RSSIs of terminals that do not belong to the current WPAN. That is, the short-range terminal determines whether the current measured highest RSSI is that of one of the short-range terminals within the current WPAN.

If the terminal with the highest RSSI is within the current WPAN, the short-range terminal determines that its location is within a valid coverage area of the current WPAN and does not attempt to connect to another WPAN. Then the short-range terminal collects information about neighbor WPANs using neighbor terminal information and RSSIs, determines the closeness between the short-range terminal and the neighbor WPANs, and determines whether to connect to another WPAN.

On the other hand, if the terminal with the highest RSSI belongs to a WPAN other than the current WPAN, the short-range terminal determines that its location is covered more strongly by a particular neighbor WPAN than by the current WPAN, that is, determines that the short-range terminal is closer to the particular neighbor WPAN. Thus, the short-range terminal operates to connect to the particular neighbor terminal in step 115. The short-range terminal detects the highest RSSI in step 115 and determines whether there is another RSSI equal to the detected RSSI in step 117. If no equal RSSI exists, the short-range terminal attempts to join a terminal with the highest RSSI in step 121. If two or more highest RSSIs exist, the short-range terminal selects one of the highest RSSIs in step 119. The selection can be made by the user or randomly according to the exemplary embodiment of the present invention. Or the selection can be made referring to a previous measured RSSI or a next measured RSSI. In other words, the short-range terminal selects an increasing RSSI referring to previous or next detected RSSIs of terminals with the highest RSSIs.

The short-range terminal detects an address of the terminal with the selected RSSI from the neighbor terminal information about the terminal in step 121 and transmits a join request message to the terminal in step 123. Then the short-range terminal monitors the reception of a join response message from the selected short-range terminal in step 125 of FIG. 2B. Upon receipt of the join response message, the short-range terminal confirms successful joining in step 127. Before step 129, the short-range terminal can receive data from the joined terminal in step 127. The short-range terminal transmits a leave message to an old joined router or coordinator terminal and completes connection to the new WPAN to which the joined terminal belongs by joining a router or coordinator of the new WPAN in step 129. While connected to the new WPAN, the short-range terminal repeats steps 105 through 129. If the neighbor terminal joined in step 127 is a coordinator, the short-range terminal only transmits the leave message to the coordinator terminal of the old WPAN in step 129 and returns to step 105.

If the short-range terminal fails to receive a join response message for the transmitted join request message a plurality of times, it discontinues attempting to connect to the new WPAN and repeats steps 107 through 129, while maintaining its connection to the current WPAN. When a radio environment is unstable or the terminal receiving the join request message cannot transmit a join response message, the short-range terminal fails to receive the join response message. In accordance with the exemplary embodiment of the present invention, a terminal that can transmit a join response message can be limited to a coordinator or router terminal that can allow joining from other terminals. While not shown in FIGS. 2A and 2B, since the short-range terminal periodically broadcasts the neighbor terminal information request message, the short range terminal may detect, within the current WPAN, a neighbor terminal with an RSSI greater than that of the terminal to which it intends to join but which does not transmit a join response message, during transmitting a join request message to the terminal and awaiting receipt of a join response message from the terminal in step 125. Also the short-range terminal may detect a terminal having a RSSI greater than the joined terminal before step 129. In this case, the short-range terminal first completes attempting to connect to the new WPAN and then can attempt to connect to another new WPAN, if the detected neighbor terminal still has the greater RSSI. It can be further contemplated as another exemplary embodiment of the present invention that the short-range terminal immediately discontinues the on-going access attempt to the new WPAN and joins the new determined terminal. Notably, the detected new terminal belongs to a WPAN different from the WPAN of the terminal which the short-range terminal is trying to join.

Figure 3:
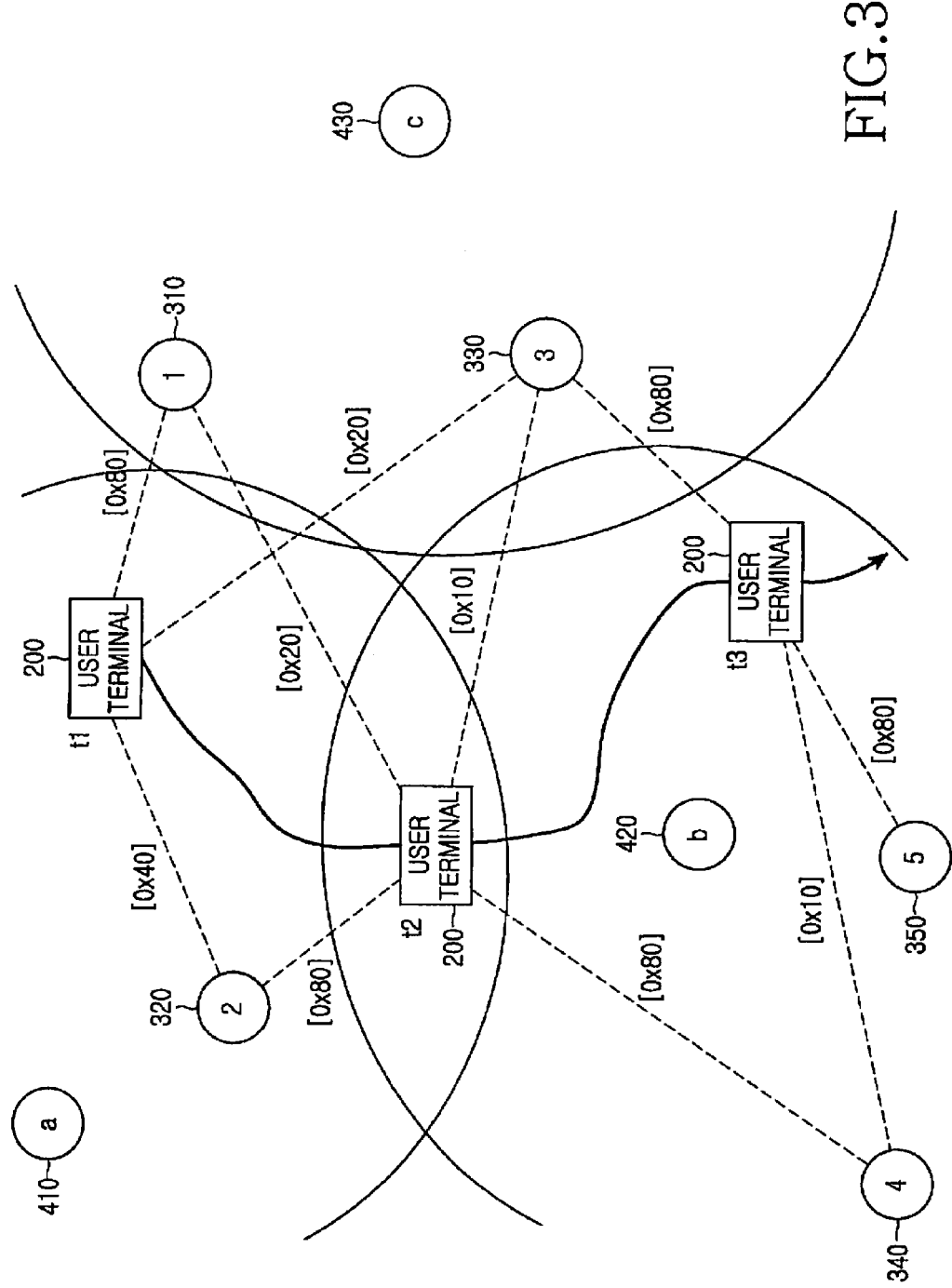
FIG. 3 is a diagram illustrating movements of the short-range terminal according to an embodiment of the present invention.
Figure 4:
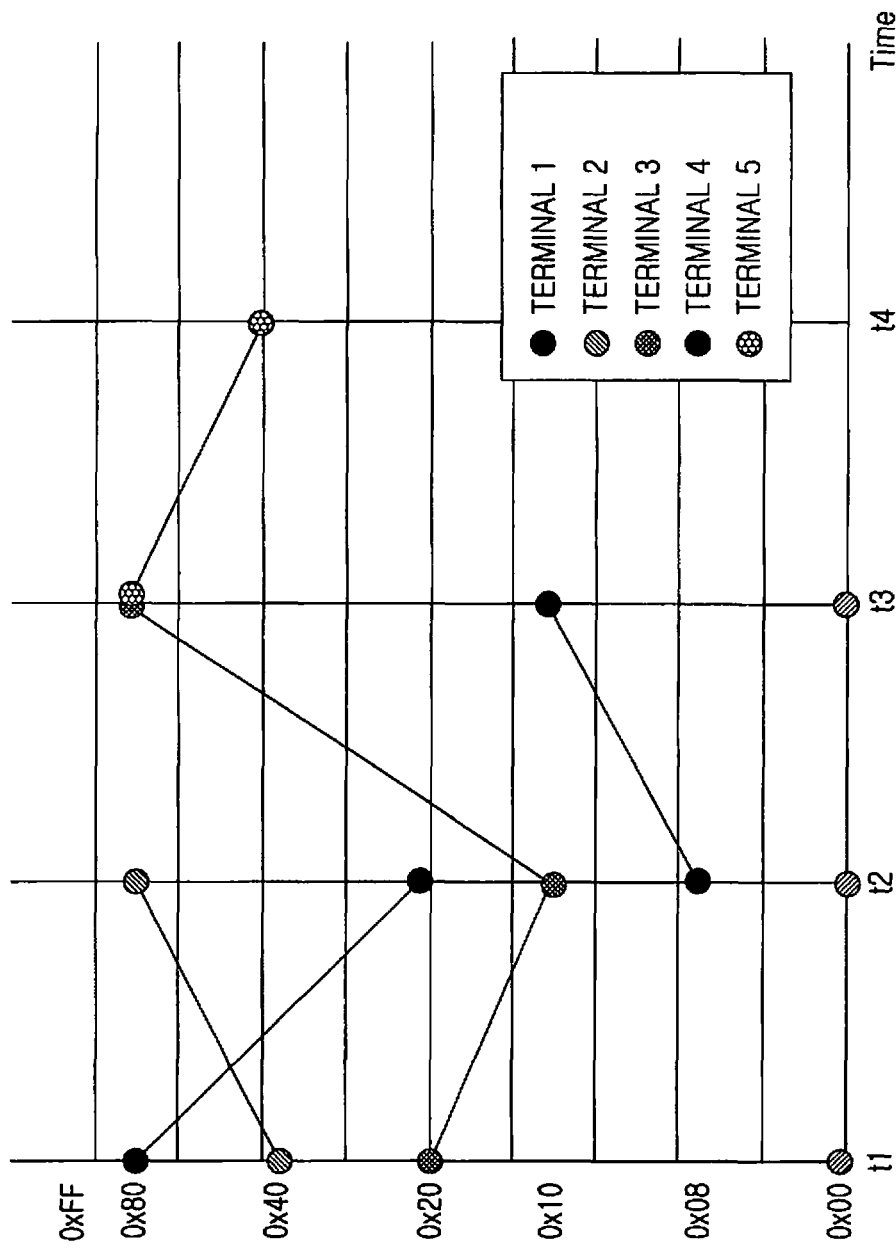
FIG. 4 is a diagram illustrating changes of the Received Signal Strength Indicators (RSSIs) of signals received from neighbor terminals during movement of the short-range terminal according to an embodiment of the present invention.
Figure 5:
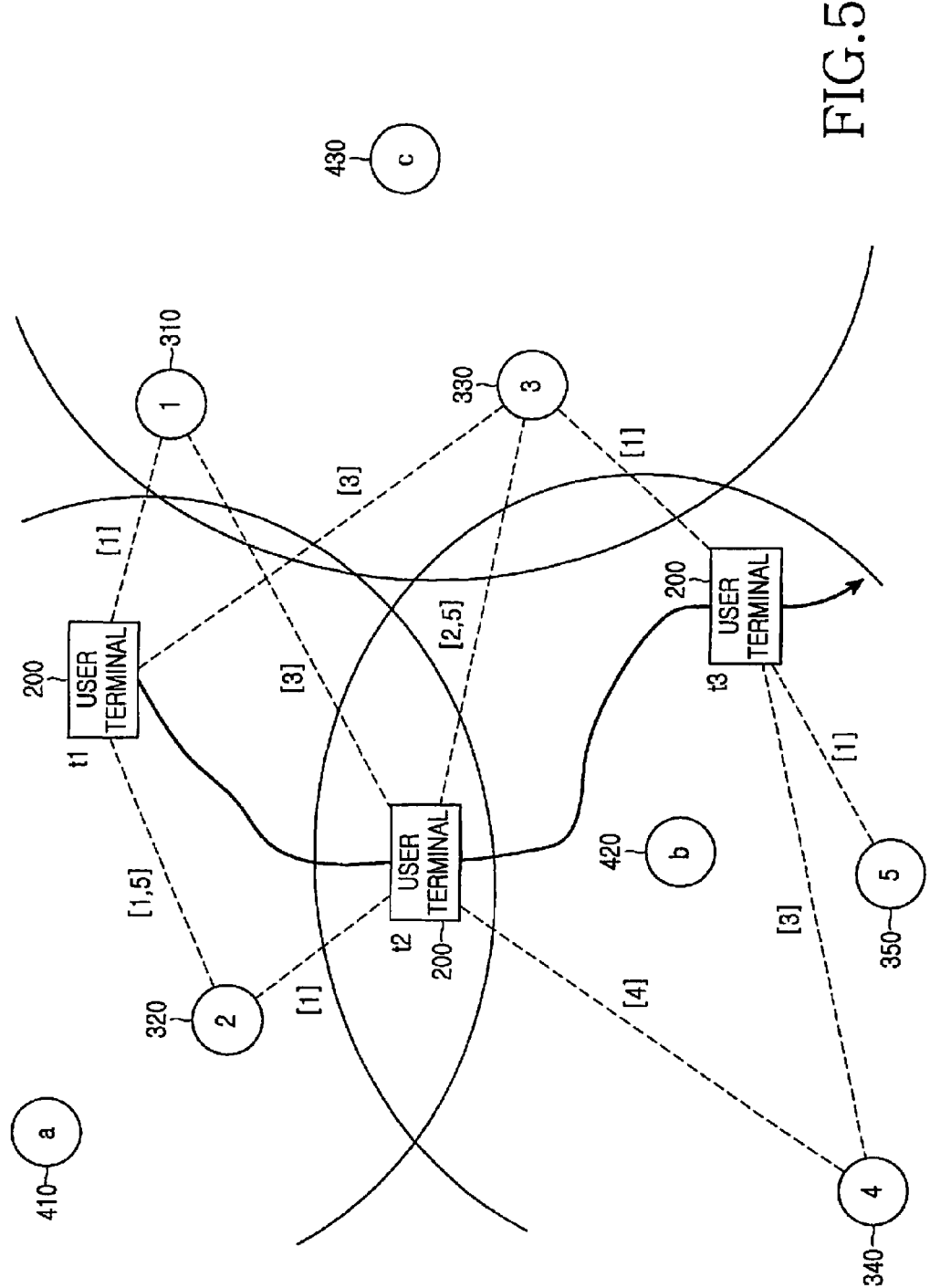
FIG. 5 is a diagram illustrating changes of distances between the short-range terminal and neighbor short-range terminals during movement of the short-range terminal according to an embodiment of the present invention.

An example of the WPAN connection operation will be described below with reference to FIGS. 3, 4, and 5. FIG. 3 illustrates movement of the short-range terminal according to an embodiment of the present invention.

Referring to FIG. 3, a moving short-range terminal is denoted as a user terminal 200. The user terminal 200 is located in an area close to a first WPAN with a coordinator terminal 410 (terminal a), a second WPAN with a coordinator terminal 420 (terminal b), and a third WPAN with a coordinator terminal 430 (terminal c), and moving from the first WPAN toward the second WPAN. The first WPAN includes a second short-range terminal 320 (terminal 2), the second WPAN includes fourth and fifth short-range terminals 340 and 350 (terminal 4 and terminal 5), and the third WPAN includes first and third short-range terminal 310 and 330 (terminal 1 and terminal 3). Numerals written over dotted lines between the user terminal 200 and the terminals 310 to 350 at locations t1, t2 and t3 denote RSSI measurements. The changes of the RSSIs of the terminals 310 to 350 are shown in FIG. 4. FIG. 4 is a graph illustrating changes of RSSIs measured with respect to neighbor terminals during movement of the short-range terminal according to an embodiment of the present invention.

At location t1, the user terminal 200 is connected to the first WPAN and broadcasts a neighbor terminal information request message periodically according to the present invention. Hence, terminal 1, terminal 2, and terminal 3 within a valid reception range of the neighbor terminal information request message receive the neighbor terminal information request message. Upon receipt of the neighbor terminal information request message, each of terminal 1, terminal 2, and terminal 3 transmits a neighbor terminal information response message including its stored neighbor table as neighbor terminal information to the user terminal 200. Upon receipt of the neighbor terminal information response messages, the user terminal 200 then measures the RSSIs of terminal 1, terminal 2, and terminal 3, stores the RSSIs together with the received neighbor terminal information on a terminal basis, and compares the RSSIs of terminal 1, terminal 2, and terminal 3. While terminal 2 is within the first WPAN to which the user terminal is currently connected and thus has an advantage over other terminals in the RSSI comparison, terminal 1 has a higher RSSI than terminal 2. Hence, the user terminal 200 attempts to join terminal 1 by transmitting a join request message. Terminal 1 then replies to the user terminal 200 with a join response message. On the assumption that the user terminal 200 does not move far from location t1 until receiving the join request response message from terminal 1, the user terminal 200 can succeed in joining terminal 1 by receiving the join response message and thus can receive data from terminal 1. Also, the user terminal 200 completes joining a new WPAN, i.e. the third WPAN, by joining the coordinator terminal 430 of the third WPAN.

When the user terminal 200 moves to location t2, the user terminal 200 receives join request response messages from terminal 4 and terminal 3 and detects the RSSIs of terminal 4 and terminal 3. As terminal 4 has the greater RSSI, the user terminal 200 joins terminal 4. The user terminal 200 now moves to location t3. Then the user terminal 200 receives join request response messages from terminal 3, terminal 4, and terminal 5 and detects their RSSIs. As a result, the highest RSSI is 80 and both terminal 3 and terminal 5 have the same RSSI of 80. In this case, since a serving WPAN, i.e. the second WPAN has priority, the user terminal 200 is maintained in the current status, without attempting an access to a new WPAN.

As described above, the short-range terminal determines its closeness to neighbor terminals and thus automatically accesses a neighbor WPAN according to the closeness according to the present invention.

While the short-range terminal attempts to access a WPAN within which a terminal has a high RSSI in the above exemplary embodiment of the present invention, it can access a new WPAN according to the change of the RSSI of each neighbor terminal in another exemplary embodiment of the present invention. For example, if the RSSI of a neighbor terminal is greater than those of terminals within a serving WPAN and increases successively every predetermined time interval or a predetermined number of or more times, this means that the short-range terminal gets closer to the neighbor terminal and thus to a WPAN to which the neighbor terminal belongs. Hence, the short-range terminal attempts to access the new WPAN. In addition, even though the RSSI of a neighbor terminal is greater than those of terminals within the serving WPAN, the short-range terminal does not attempt to join the neighbor terminal unless the RSSI of the neighbor terminal increases successively every predetermined time intervals or a predetermined number of or more times.

RSSI is used as a criterion for determining the relationship between the short-range terminal and a neighbor terminal or a neighbor WPAN in the above-described exemplary embodiments of the present invention. Besides RSSI, Link Quality Indication (LQI) or a distance equivalent to an LQI can be used. That is, upon receipt of a neighbor terminal information request message, a short-range terminal transmits a neighbor terminal information response message including an LQI and neighbor terminal information to a transmitting short-range terminal, wherein the neighbor terminal information includes neighbor router information about the at least one neighbor terminal. The transmitting short-range terminal detects the LQI and calculates a distance between it and the neighbor short-range terminal, equivalent to the LQI. The LQI is used as a base on which to attempt to access a new WPAN. Distances between the short-range terminal and neighbor terminals, derived from LQIs in the illustrated case of FIG. 3 are illustrated in FIG. 5. When the short-range terminal releases a connection from a serving WPAN or connects to a new WPAN, it can notify the serving WPAN or the new WPAN of the connection release or the connection. Also, a terminal can include a brief description of its serving WPAN in a neighbor terminal information response message so that the user of the short-range terminal receiving the neighbor terminal information response message can refer to the WPAN description in WPAN selection.

As is apparent from the above description, the present invention advantageously enables a short-range terminal to fast connect to a new WPAN automatically using the RSSIs or LQIs of neighbor short-range terminals by simplified user manipulations.

While the present invention has been shown and described with reference to certain exemplary embodiments of the present invention thereof, they are mere exemplary applications. For example, while a short-range terminal first requests joining to an intended terminal (router or coordinator) based on neighbor table information and RSSIs or LQIs or the change of the RSSIs or LQIs and then transmits a leave message to an old connected terminal in the exemplary embodiments of the present invention, the leave message transmission may precede the transmission of the joining request and the reception of the join response from the intended terminal. Thus, it will be understood by those skilled in the art that various changes in form and details may be made therein without departing from the spirit and scope of the present invention as defined by the appended claims and their equivalents.

What is claimed is:

1. A method for reconnecting from a serving coordinator of a serving Wireless Personal Area Network (WPAN) to a coordinator of another WPAN, the method comprising: broadcasting a neighbor terminal information request message periodically to neighbor terminals; receiving a neighbor information response message, having neighbor terminal information and Link Quality Information (LQI), from at least one neighbor terminal, responding to the neighbor terminal information request message; storing a neighbor table having the LQI and the neighbor terminal information included in the neighbor information response message, the neighbor terminal information including the LQI, a Personal Area Network (PAN) Identifier (ID) of a WPAN to which the at least one neighbor terminal belongs and neighbor router information about the at least one neighbor terminal; and reconnecting to the coordinator of the another WPAN based on the LQI and the neighbor terminal information and communicating with the coordinator of the other WPAN, wherein the neighbor table further includes information indicating whether the at least one neighbor terminal is a coordinator, a router or a terminal.

2. The method of claim 1, wherein the neighbor router information includes information about routers within neighbor candidate WPANs, the routers relaying data of the terminal to coordinators within the neighbor candidate WPANs.

3. The method of claim 1, wherein the neighbor table further includes relation information indicating whether the at least one neighbor terminal is a parent, a child, a previous child, or none to the terminal.

4. The method of claim 1, wherein the LQI is a ratio between a data transmission power value and an error rate between the at least one neighbor terminal and the terminal.

5. The method of claim 1, wherein the reconnection and communication comprises:
detecting a greatest LQI from among stored LQIs;
reconnecting, if there is one greatest LQI and a WPAN connected to a terminal with the largest LQI is different from the serving WPAN, to a coordinator of the WPAN and communicating with the coordinator of the WPAN;
maintaining a connection to the serving coordinator of the serving WPAN, if there are at least two greatest LQIs and one of WPANs connected to terminals with the largest LQIs is the serving WPAN; and selecting, if there are at least two greatest LQIs and WPANs connected to terminals with the largest LQIs are different from the serving WPAN, one of the terminals with the greatest LQIs, reconnecting to a coordinator of the WPAN connected to the selected terminal, and communicating with the coordinator of the WPAN.

6. The method of claim 1, wherein the reconnection and communication comprises:
detecting a greatest LQI from among stored LQIs; and
reconnecting, if a WPAN connected to a terminal with the greatest LQI is different from the serving WPAN and the LQI of the terminal increases continuously for a predetermined time, to a coordinator of the WPAN and communicating with the coordinator of the WPAN.

7. The method of claim 1, wherein the reconnection and communication comprises:
requesting joining to a coordinator of a WPAN corresponding to a greatest LQI;
receiving a response for the joining request; and
transmitting a leave message to the serving coordinator of the serving WPAN.

8. An apparatus for reconnecting from a serving coordinator of a serving Wireless Personal Area Network (WPAN) to a coordinator of another WPAN by communications in a terminal, the apparatus comprising: a transceiver for transmitting and receiving signals and messages and receiving a neighbor information response message, having neighbor terminal information and Link Quality Information (LQI), from at least one neighbor terminal, responding to a neighbor terminal information request message; and a controller for controlling the transceiver, broadcasting the neighbor terminal information request message periodically through the transceiver, storing a neighbor table having the LQI and the neighbor terminal information included in the neighbor information response message, the neighbor terminal information including the LQI, a Personal Area Network (PAN) Identifier (ID) of a WPAN to which the at least one neighbor terminal belongs and neighbor router information about the at least one neighbor terminal, and reconnecting to the coordinator of the another WPAN based on the LQI and the neighbor terminal information and communicating with the coordinator of the other WPAN, wherein the neighbor table further includes information indicating whether the at least one neighbor terminal is a coordinator, a router or a terminal.

9. The apparatus of claim 8, wherein the neighbor router information includes information about routers within neighbor candidate WPANs, the routers relaying data of the terminal to coordinators within the neighbor candidate WPANs.

10. The apparatus of claim 8, wherein the neighbor table further includes relation information indicating whether the at least one neighbor terminal is a parent, a child, a previous child, or none to the terminal.

11. The apparatus of claim 8, wherein the LQI is a ratio between a data transmission power value and an error rate between the at least one neighbor terminal and the terminal.

12. The apparatus of claim 8, wherein the controller detects a greatest LQI from among stored LQIs, and if there is one greatest LQI and a WPAN connected to a terminal with the greatest LQI is different from the serving WPAN, the controller reconnects to the coordinator of the WPAN and communicates with the coordinator of the WPAN 13. The apparatus of claim 12, wherein if there are at least two greatest LQIs and one of WPANs connected to terminals with the greatest LQIs is the serving WPAN, the controller maintains a connection to the serving coordinator of the serving WPAN.

14. The apparatus of claim 13, wherein if there are at least two greatest LQIs and WPANs connected to terminals with the greatest LQIs are different from the serving WPAN, the controller selects one of the terminals with the greatest LQIs, reconnects to a coordinator of the WPAN connected to the selected terminal, and communicates with the coordinator of the WPAN.

15. The apparatus of claim 8, wherein when the controller reconnects to the coordinator of the another WPAN and communicates with the coordinator of the another WPAN, the controller detects a greatest LQI from among stored LQIs, and if a WPAN connected to a terminal with the greatest LQI is different from the serving WPAN and the LQI of the terminal increases continuously for a predetermined time, the controller reconnects to a coordinator of the WPAN and communicates with the coordinator of the WPAN.

16. The apparatus of claim 8, wherein when the controller reconnects to the coordinator of the another WPAN and communicates with the coordinator of the another WPAN, the controller requests joining to a coordinator of a WPAN corresponding to a greatest LQI, receives a response for the joining request, and transmits a leave message to the serving coordinator of the serving WPAN.

* * * * *